June 9, 1953     C. J. THOMPSON     2,641,068
REVERSIBLE INSOLE
Filed April 4, 1950

INVENTOR
CLIFFORD JAMES THOMPSON,
BY Henry H. Snelling
ATTORNEY

Patented June 9, 1953

2,641,068

UNITED STATES PATENT OFFICE 2,641,068

REVERSIBLE INSOLE

Clifford James Thompson, Davenport, Fla.

Application April 4, 1950, Serial No. 153,960

2 Claims. (Cl. 36—44)

This invention relates to reversible insoles and has for its principal object the provision of a laminated insole which, with one side down, insulates the feet against losing heat to a cold supporting surface and when reversed will restrict heat from passing from a hot pavement to the feet, thus avoiding excessive perspiration in the case of a hot supporting surface and preventing loss of energy to cold floors or pavements.

A further object of the invention is to provide a laminated insole of a thickness of not materially greater than thirty thousandths of an inch in which the laminations include a metal foil, a heat transfer layer on one side of the foil and a heat absorbing material on the other side of the foil. These layers, with or without other layers, are cemented together by the use of a thermo plastic adhesive. The plastic could extend around the edge only but I prefer to have two full layers as in Figure 3 as the edge layer is usually not sufficient to prevent the layers from creeping in the center under the action of the foot in walking. The thermo plastic layers are water-proof, odorless, and give a tight seal, making the laminations more rigid by adding strength to the insole as a whole.

A further object of the invention is to provide a reversible easy-washable insole of a thickness not greater than a twenty-fifth of an inch and which is provided with a durable material to retain the shape of the insole and prevent undue flexing of the heat reflecting surface of the aluminum foil which can be of a thickness of a thousandth of an inch when properly supported.

Figure 1:
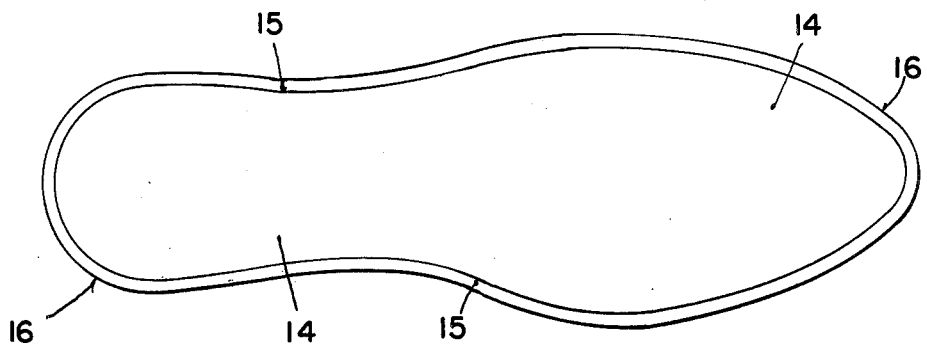
Figure 1 is a top plan view of an insole.
Figure 2:
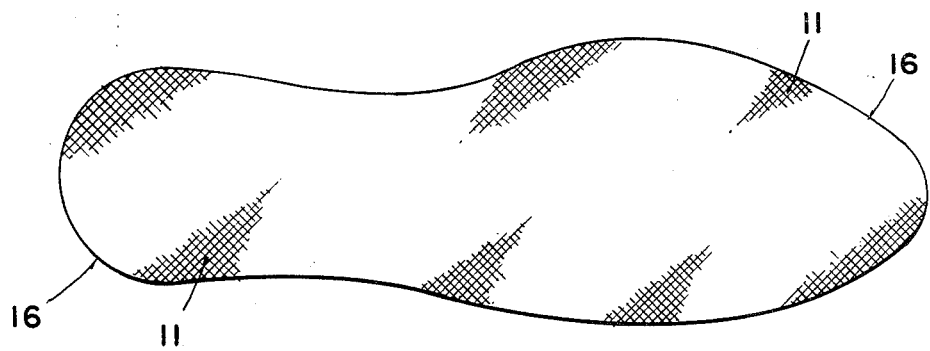
Figure 2 is a view of the insole reversed.

There are many flexible insoles on the market, each intended for some specific purpose. Practically all of them are objectionable because of their thickness and most are objectionable, as well, in that they provide for protection against cold or against heat, but not against both. The present insole is intended to be placed inside the shoe, fitting snugly and preferably not attached to the shoe in any way.

The aluminum foil 10 is quite thin and reflects heat from each of its two opposite surfaces. It is backed on one side by the porous material 11 which preferably is a mere sheet of gauze. Other kinds of cloth are satisfactory if there are holes of sufficient size to furnish a heat transfer action. A thin sheet of leather with or without perforations can be used, but it is difficult to find leather sufficiently thin for the purpose. A thin sheet of plastic having a regular system of holes is also applicable but is far less satisfactory than the preferred thin sheet cloth.

On the opposite side of the aluminum foil 10 is a black heat-absorbing material 12. This can be a mere layer of black felt, cloth, or similar material or could be ordinary treated black paper. On the outside of the sole on the same side as the heat absorbent material 12, is a layer 14 of durable material which could be separate from the heat-absorbent material but could be combined with it. The preferred material for the durable layer 14 is a very light-weight woven cloth. A light weight canvas is excellent. It could be any reasonably stiff cloth, pasteboard, paper, fiber, solid sheet plastic, or any other material which would retain the shape of the insole. Sometimes a second sheet of aluminum foil is placed between the heat-absorbent material 12 and the durable material 14, but the additional cost of the second layer of aluminum foil seems to be greater than the additional advantages.

The device can employ a less number of layers, exclusive of the plastic, or sewing, or other securing means, for example three, the porous layer 11, the aluminum foil 10, and the retaining material 14, in this case integral with the heat absorbing layer 12. The layer 12, whether separate or as a coating on layer 14, would always be between the material 14, which readily stands wear, and the aluminum foil 10 or other heat reflecting unit.

These three or more layers (11, 10 and 12 plus 14, if three; 11, 10, 12 and 14, if four) could be cemented together but it is difficult to find any cement that would not make the insole either too thick or too rough on the feet or not sufficiently effective. By using a thermo plastic adhesive edge layer 15 between the foil 10 and the heat transfer layer 11 while using full layers 16 of the thermo plastic adhesive between all the other layers, instead of sewing or using cement, the insole is highly satisfactory. Its thickness can readily be held to the desired three hundredths of an inch.

Figure 4:
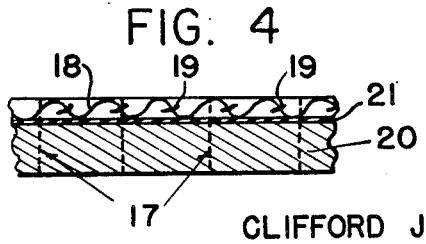
Figure 4 is a modification.

While, as stated, the use of a thermo plastic adhesive is preferred, it is sometimes advantageous to use stitching for example in the modified form shown in Fig. 4 the aluminum impregnated layer is secured to the lower layer which takes care of absorption, wear and retention of shape, by lines of stitching indicated by the numeral 17.

A very satisfactory insole can be made with only two layers, yet having all the advantages of the preferred four layer device and employing precisely the same functions. A typical example uses the porous layer as the carrier for the aluminum, and the durable layer as the carrier for the heat absorbing medium. In such case the durable layer carries as its inside surface the heat absorbing material, tar, black felt, etc. and the textile layer would be sprayed with aluminum which then would be locked in by pressure and heat so that the insole can be washed without loss of the metal. An alternative method presses the aluminum foil to the inside surface of the porous layer so the foil no longer presents an unbroken surface in fact, altho operating as such. The aluminum may be electroplated on its carrier. Such a construction is shown in Figure 4 where the textile layer 18 carries the aluminum 19 in any of the ways mentioned above or in any other similar manner, and the durable layer 20 carries the flexible layer of heat absorbing material 21 on the side nearest the heat reflecting layer 18—19 in which the metal is carried by the gauze or other textile material.

Figure 3:
Figure 3 is a cross-section thru the laminated insole, the figure being greatly enlarged.

When the insoles are placed in the shoes as in Fig. 3, the feet of the user are kept warm. The wearing surface 14 is against the shoe. The porous layer which forms a heat transfer means is against the sox of the user. Heat given off from the feet is reflected back by the aluminum foil 10 through the open mesh permitting free heat travel by reflection and not by conduction. This keeps the feet warm. In the summertime the insoles are reversed and at this time the relatively sturdy layer 14 is against the sox and the porous layer 11 is against the shoe. Heat rising from the pavement is reflected back through the porous layer 11 by the aluminum foil 10. The black layer above the foil absorbs heat from the feet to the extent permitted by the fabric layer 14. This limits sharply direct conduction of heat from the ground and avoids excessive perspiration which in turn causes a number of foot disorders.

In experimental work the reversible insoles have been found particularly advantageous to policemen, mailmen, gas station attendants and when used as in Figure 3 by workers in cold storage rooms. These latter workers have reported remarkable lessening of fatigue whether wearing shoes or rubber boots as the insoles prevent loss of heat from body to the floor and consequently avoid the serious energy loss that would normally occur.

What I claim is:

1. An insole for protection of the wearer against cold or heat, depending upon which face of the insole is toward the bottom of the shoe, boot, or other outer foot covering, said insole including a flexible durable material forming an outside layer to take care of wear and to retain the shape of the insole, a fabric impregnated with aluminum for reflecting heat forming the other outside layer of the insole, a black heat absorbing material between the two outside layers, and thermoplastic adhesive securing together as a single unit the stated materials.

2. The insole of claim 1 in which the black material is a coating on the inside of one of the two outside layers, said insole being washable on both flat sides and the total thickness of the insole being less than .040" whereby to minimize the space required between the outer foot covering such as a shoe and the inner foot covering such as a sock.

CLIFFORD JAMES THOMPSON.

References Cited in the file of this patent

UNITED STATES PATENTS

| Number | Name | Date |
| --- | --- | --- |
| 351,849 | Buckingham | Nov. 2, 1886 |
| 445,312 | French | Jan. 27, 1891 |
| 450,920 | Snellenburg et al. | Apr. 21, 1891 |
| 582,670 | McWilliam | May 18, 1897 |
| 859,113 | Roosa | July 2, 1907 |
| 1,519,009 | Reina | Dec. 9, 1924 |
| 1,663,944 | Hopfelt | Mar. 27, 1928 |
| 1,959,057 | Kliefoth | May 15, 1934 |
| 2,284,947 | Clifford | June 2, 1942 |
| 2,383,122 | Ghez et al. | Aug. 21, 1945 |
| 2,439,137 | Keller | Apr. 6, 1948 |
| 2,495,045 | Woodbury et al. | Jan. 17, 1950 |
| 2,561,891 | Tucker | July 24, 1951 |

FOREIGN PATENTS

| Number | Country | Date |
| --- | --- | --- |
| 375,881 | France | July 25, 1907 |
| 12,079 | Great Britain | May 15, 1914 |
| 108,409 | Switzerland | Jan. 2, 1925 |
| 519,411 | Germany | Feb. 27, 1931 |
| 349,208 | Great Britain | May 28, 1931 |